US009747894B2

(12) United States Patent
Hsu et al.

(10) Patent No.: US 9,747,894 B2
(45) Date of Patent: Aug. 29, 2017

(54) SYSTEM AND ASSOCIATED METHOD FOR SPEECH KEYWORD DETECTION ENHANCED BY DETECTING USER ACTIVITY

(71) Applicant: MEDIATEK Inc., Hsin-Chu (TW)

(72) Inventors: Chao-Ling Hsu, Hsinchu (TW); Yiou-Wen Cheng, Hsinchu (TW); Liang-Che Sun, Taipei (TW); Yuanyuan Wang, Beijing (CN)

(73) Assignee: MEDIATEK INC., Hsin-Chu (TW)

( * ) Notice: Subject to any disclaimer, the term of this patent is extended or adjusted under 35 U.S.C. 154(b) by 131 days.

(21) Appl. No.: 14/166,881

(22) Filed: Jan. 29, 2014

(65) Prior Publication Data

US 2015/0161989 A1    Jun. 11, 2015

(30) Foreign Application Priority Data

Dec. 9, 2013  (CN) .......................... 2013 1 0659840

(51) Int. Cl.
   *G10L 15/08*    (2006.01)
   *G10L 15/22*    (2006.01)

(52) U.S. Cl.
   CPC .............. *G10L 15/08* (2013.01); *G10L 15/22* (2013.01); *G10L 2015/228* (2013.01)

(58) Field of Classification Search
   CPC ....... G10L 15/22; G01J 3/2823; G01J 3/0205; G01J 3/027; G01J 3/0229
   USPC ......................................... 704/251; 358/418
   See application file for complete search history.

(56) References Cited

U.S. PATENT DOCUMENTS

| 3,430,235 | A | * | 2/1969 | Bender | .................. G01S 7/2922 342/93 |
| 4,366,378 | A | * | 12/1982 | Simons | .................... H01J 40/14 250/214 AG |
| 5,194,847 | A | * | 3/1993 | Taylor | .................... G01H 9/004 340/541 |
| 5,629,520 | A | * | 5/1997 | Sonstroem | .............. F41G 3/147 250/330 |
| 5,960,394 | A | * | 9/1999 | Gould | .................... G09B 19/04 704/231 |
| 6,389,881 | B1 | * | 5/2002 | Yang | ..................... G01M 3/243 73/40.5 A |
| 8,614,431 | B2 | * | 12/2013 | Huppi et al. | ............. 250/559.36 |
| 8,860,942 | B1 | * | 10/2014 | Ewing | ................... G01J 3/2823 356/419 |
| 2007/0038461 | A1 | * | 2/2007 | Abbott et al. | ................ 704/275 |

(Continued)

FOREIGN PATENT DOCUMENTS

| WO | 2004057574 A1 | 7/2004 |
| WO | 2009045861 A1 | 4/2009 |

*Primary Examiner* — Akwasi M Sarpong
(74) *Attorney, Agent, or Firm* — McClure, Qualey & Rodack, LLP

(57) ABSTRACT

The invention provides a system for speech keyword detection and associated method. The system includes a speech keyword detector, an activity predictor and a decision maker. The activity predictor obtains sensor data provided by a plurality of sensors, and processes the sensor data to provide an activity prediction result indicating a probability for whether a user is about to give voice keyword. The decision maker processes the activity prediction result and a preliminary keyword detection result of the speech keyword detection to provide a keyword detection result.

20 Claims, 11 Drawing Sheets

(56) References Cited

U.S. PATENT DOCUMENTS

| | | | |
|---|---|---|---|
| 2009/0265671 A1* | 10/2009 | Sachs | G06F 3/017 |
| | | | 715/863 |
| 2010/0241431 A1 | 9/2010 | Weng et al. | |
| 2010/0277579 A1* | 11/2010 | Cho et al. | 348/61 |
| 2012/0253803 A1 | 10/2012 | Sugiura et al. | |

* cited by examiner

SYSTEM AND ASSOCIATED METHOD FOR SPEECH KEYWORD DETECTION ENHANCED BY DETECTING USER ACTIVITY

This application claims the benefit of People's Republic of China application serial No. 201310659840.4, field Dec. 9, 2013, the subject matter of which is incorporated herein by reference.

FIELD OF THE INVENTION

The invention relates to a system for speech keyword detection and associated method, more particularly, to a system for enhancing speech keyword detection by exploiting sensors to detect user activity, and associated method.

BACKGROUND OF THE INVENTION

Electronic devices with voice control and/or interaction capability become more and more popular because they can provide hand-free user interface. Voice recognition for identifying keywords, including commands, in voice is essential to implement voice control and/or interaction capability.

SUMMARY OF THE INVENTION

The invention discloses a system for speech keyword detection, including a speech keyword detector, an activity predictor, a decision maker, an activity database and a keyword database. The activity database includes a number of (one or more) activity lists; each activity list is associated with a target application, and includes one or more activity templates. The keyword database includes one or more keyword lists; each keyword list is associated with a target application, and includes one or more candidate keywords.

The activity predictor obtains sensor data provided by one or more sensors, obtains a selected activity list from the activity database with the target application of the selected activity matching a currently running application of the device, and accordingly processing the sensor data to provide an activity prediction result indicating a probability for whether a user is about to give voice keyword. The activity predictor compares the sensor data with each activity template of the selected activity list, and accordingly provides an activity matching result to be included in the activity prediction result. Alternatively, the activity predictor obtains extracted data by extracting features of the sensor data, and then compares the extracted data with each activity template of the selected activity list to accordingly provide an activity matching result to be included in the activity prediction result.

The speech keyword detector obtains a selected keyword list from the keyword database with the target application of the selected keyword list matching the currently running application of the device, and accordingly providing a preliminary keyword detection result. Preferably, the speech keyword detector compares incoming sound with each candidate keyword of the selected keyword list to accordingly provide the preliminary keyword detection result.

The decision maker is coupled to the activity predictor and the speech keyword detector, and is capable of processing the activity prediction result and the preliminary keyword detection result to provide a second (e.g., an improved) keyword detection result. For example, the decision maker can adopt a probability fusion algorithm based on, e.g., Dempster-Shafer theory or a machine learning algorithm based on, e.g., Gaussian mixture model to process the activity prediction result and the preliminary keyword detection result, and accordingly provide the second keyword detection result. For another example, the decision maker can calculate a linear combination (e.g. a weighted sum) of the activity prediction result and the preliminary keyword detection result as the second keyword detection result.

The system further includes a voice detector. The voice detector is coupled to the speech keyword detector, and is capable of evaluating informativeness (e.g. by SNR, signal-to-noise ratio) of incoming sound, and accordingly determining whether to enable the speech keyword detector. When informativeness of incoming sound is low (e.g. below an informativeness threshold), the voice detector disables the speech keyword detector. When informativeness of incoming sound is high (e.g. greater than the informativeness threshold), the voice detector enables the speech keyword detector. When the speech keyword detector is disabled, the activity predictor and/or the decision maker do not have to work, so the activity predictor and/or the decision maker can also be disabled. When the speech keyword detector is enabled, the activity predictor and/or the decision maker can also be enabled to cooperate with the speech keyword detector.

The voice detector includes a first estimator, a second estimator and a comparator coupled to the first estimator, the second estimator and the speech keyword detector. The first estimator generates a current sample of a first sequence as a weighted sum of a current volume of incoming sound and a preceding sample of the first sequence; i.e., computing the current sample of the first sequence by summing a first product and a second product, wherein the first product is a result of multiplying the preceding sample of the first sequence with a first weighting, and the second product is a result of multiplying the current volume of incoming sound with a first complementary weighting. The first weighting can be greater than 0 and less than 1; the first complementary weighting can equal to 1 minus the first weighting.

The second estimator generates a current sample of a second sequence as a weighted sum of the current volume of incoming sound and a preceding sample of the second sequence; i.e., computing the current sample of the second sequence by summing a third product and a fourth product, wherein the third product is a result of multiplying the preceding sample of the second sequence with a second weighting, and the fourth product is a result of multiplying the current volume of incoming sound with a second complementary weighting. The second weighting can be greater than 0 and less than 1; the second complementary weighting can equal to 1 minus the second weighting.

Preferably, the first weighting is less than the second weighting. Thus, the first sequence can indicate meaningful signal (voice) contained in incoming sound, and the second sequence can indicate noise in the sound. The comparator of the voice detector compares the first sequence and the second sequence to indicate the informativeness of incoming sound. For example, if an absolute difference between the first and second sequence is greater than an informativeness threshold, then the voice detector reflects a high informativeness to enable the speech keyword detector. If the absolute difference is less than the informativeness threshold, then the voice detector can reflect a low informativeness to disable the speech keyword detector.

The sensors providing the sensor data include one or more of the following: an accelerometer, a gyroscope, a magnetometer, a barometer, a proximity sensor, a light sensor, a touch screen, a receiver of a positioning system, a wireless receiver and a camera.

The invention further discloses a method for speech keyword detection, including: obtaining sensor data provided by one or more sensors, accordingly computing an activity prediction result indicating a probability for whether a user is about to give voice keyword, and computing a second keyword detection result according to the activity prediction result and a preliminary keyword detection result of the speech keyword detection.

Numerous objects, features and advantages of the invention will be readily apparent upon a reading of the following detailed description of embodiments of the invention when taken in conjunction with the accompanying drawings. However, the drawings employed herein are for the purpose of descriptions and should not be regarded as limiting.

BRIEF DESCRIPTION OF THE DRAWINGS

The above objects and advantages of the invention will become more readily apparent to those ordinarily skilled in the art after reviewing the following detailed description and accompanying drawings, in which.

DETAILED DESCRIPTION OF PREFERRED EMBODIMENTS

Figure 1:
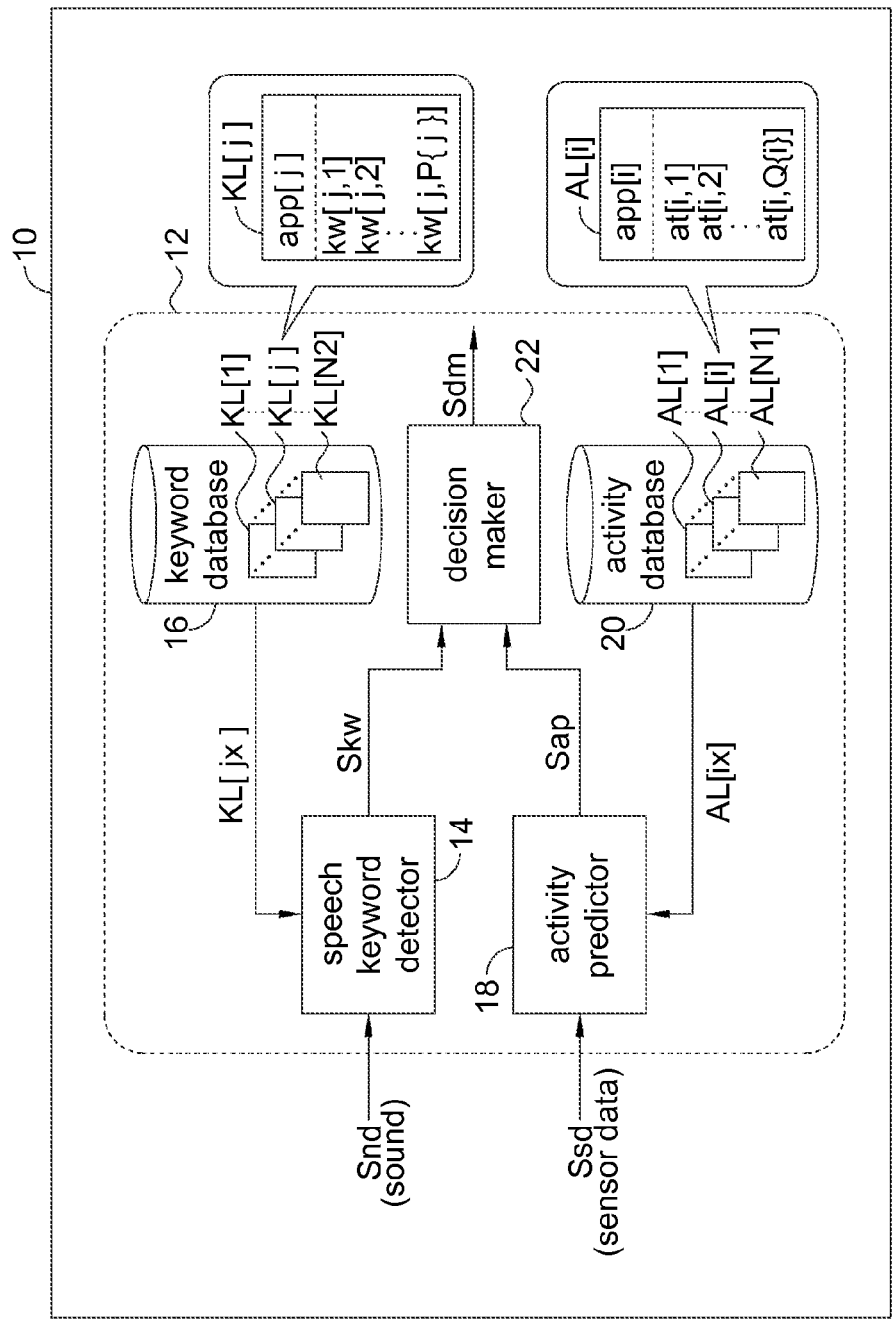
FIG. 1 illustrates a system for speech keyword detection according to an embodiment of the invention.

To increase awareness and interactivity with user and surroundings, modern electronic device is equipped with quite a number of sensors. For example, sensors of a communication device, e.g. a smart mobile phone, may include an accelerometer, a gyroscope, a magnetometer, a barometer, a proximity sensor, a light sensor, a touch screen, a receiver of a positioning system, a wireless receiver and/or a camera, etc.

Sensor data provided by the sensor(s) of a device can be leveraged to derive activity information about user-device interaction, user status and/or environment surrounding the device. Activity information about user-device interaction can include: (a) whether the device is raised, lowered, lifted up, put down, flipped, dropped, shaken, steadily held, tilted, kept flat, moved close to something (e.g., user), moved away from something, and/or placed in dark environment (e.g., in a bag or backpack) or light environment, etc.; (b) an incoming event representing whether the device needs to interact with the user, e.g., whether the device receives an incoming call, message and/or e-mail, and/or whether the device is going to alert a pre-defined moment, such as a morning call, a wake-up call, an alarm, a reminder, a screen pop-up for incoming to-do item, meeting listed in calendar, datebook and/or schedule. Activity information about user status can include whether user is walking, running, and/or driving, etc. Activity information about environment can include: ambient temperature, noise, brightness, location, position and current time.

In this embodiment, user's voice keyword (command) often occurs after (and/or along with) activity of recognizable pattern. Taking a mobile phone as an example: when the phone rings for an incoming call, user's natural response is first raising the phone to view related information, e.g., who the caller is, and then deciding how to respond, e.g., to answer or to ignore/reject the call. Thus, activity of raising is a clue to cue the phone to expect voice responding keyword (command). Alternatively, when the user wants to take a photo by camera function of the phone, user's natural action is first keeping the phone steady, and then instructing the phone to shoot. Hence, activity of keeping steady provides information about when to expect a voice shooting keyword.

Preferably, the sensor data is utilized to indicate whether activity of the known pattern occurs, and accordingly enhances speech keyword detection by providing additional information, e.g., by predicting when user is going to say voice keyword. For example, a keyword can be a command, an instruction, a term for querying search engine(s) and/or artificial intelligence engine(s), and/or an informative voice, e.g., "Yee-Ha!" though which may not be an official vocabulary.

For example, when the phone rings for an incoming call and activity of phone raising is detected, the phone can accordingly predict that user is going to give voice responding keyword such as "answer" or "reject", and therefore adjust sensitivity of speech keyword detection to ease recognition of the later spoken responding keyword, e.g., "answer" or "reject". For example, when the phone is switched to camera function and activity of keeping steady is detected, the phone can expect a voice shooting keyword, e.g. "cheese", to trigger photo shooting, and then adjust sensitivity of speech keyword detection to ease recognition of the voice shooting keyword.

Thus, speech keyword detection can be enhanced according to activity prediction of the invention, wherein the activity prediction is designed to leverage sensor data and accordingly detect occurrence of indicating activities, which happen before (or when) user is about to give voice keyword. Moreover, speech keyword detection and activity prediction can be performed in context of application scenario. In this embodiment, when a phone is running a communication application to ring for an incoming call, activity prediction is arranged to detect occurrence of a first set of related indicative activities (e.g., phone raising), and speech keyword detection is arranged to recognize a first set of related voice keywords, such as responding keywords, e.g. "answer" or "reject". When the phone is running a camera application, activity prediction is arranged to detect occurrence of a second set of related indicative activities (e.g., keeping steady), and speech keyword detection is arranged to recognize a second set of related voice keywords, e.g., voice shooting keyword like "cheese."

There are two kinds of errors to degrade performance of speech keyword detection, including miss error and false alarm error. Miss error happens when user does give voice keyword but speech keyword detection fails to recognize the spoken voice keyword. False alarm error happens when user does not give any voice keyword but speech keyword detection erroneously determines that a voice keyword has been said.

Speech keyword detection has an adjustable sensitivity (or recognition tendency) for a trade-off between miss error and false alarm error. Increasing sensitivity makes speech keyword detection tend to interpret incoming sound as voice keyword, even when the incoming sound is less likely to contain voice keyword. Consequently, increasing sensitivity lowers probability of miss error while probability of false alarm error is raised. On the other hand, decreasing sensitivity lowers tendency for speech keyword detection to interpret incoming sound as voice keyword, even when the incoming sound is much likely to contain voice keyword. Hence, decreasing sensitivity raises probability of miss error but lowers probability of false alarm error.

In this embodiment, sensitivity of speech keyword detection is adaptively and dynamically adjusted according to activity prediction, so both miss error and false alarm error can be suppressed without compromising. When an indicative activity is detected, sensitivity to recognize related voice keyword can be raised, so incoming sound is more likely to be recognized as related voice keyword, even though the spoken keyword is faint, unclear and/or noisy; hence, miss error is suppressed. On the other hand, during absence of indicative activities, sensitivity of speech keyword detection can be lowered, so false alarm error can be suppressed because incoming sound is less likely to be incorrectly recognized as voice keyword.

Please refer to FIG. 1. FIG. 1 illustrates a device 10 integrated with a system 12 for enhancing a speech keyword detector 14 according to an embodiment of the invention. The device 10 can be a consumer electronic, such as a communication device (e.g. a mobile phone, a cell phone, a smart phone), a hand-held or portable computer, an acoustically interactive and/or controllable personal health-care device, toy, wearable device (e.g. watch), television, media player, media recorder (e.g. digital camera or camcorder), navigator or positioning device, etc. In an embodiment, the speech keyword detector 14 is arranged to automatically keep monitoring whether incoming sound contains voice keyword, even without user's cue.

To improve performance of the speech keyword detector 14, the system 12 further includes a keyword database 16, an activity predictor 18, an activity database 20 and a decision maker 22. The keyword database 16 is coupled to the speech keyword detector 14, and includes a number N2 (equal to or greater than 1) of keyword lists KL[1] to KL[N2]. Preferably, each keyword list KL[j] (for j=1 to N2) is associated with a target application app[j], and includes an amount P{j} (equal to or greater than 1) of candidate keywords kw[j,1] to kw[j,P{j}]. Different keyword lists can associate with different target applications, and can have different amount of candidate keywords. That is, for indices j1 not equal to j2, the target application app[j1] of the keyword list KL[j1] can differ from the target application app[j2] of the keyword list KL[j2]; the amount P{j1} of the keyword list KL[j1] can differ from or be equal to the amount P{j2} of the keyword list KL[j2].

The activity database 20 is coupled to the activity predictor 18, and includes a number N1 (equal to or greater than 1) of activity lists AL[1] to AL[N1]; each activity list AL[i] (for i=1 to N1) is associated with a target application app[i], and includes an amount Q{i} (equal to or greater than 1) of activity templates at[i,1] to at[i,Q{i}]. Different activity lists can associate with different target applications, and can have different amount of activity templates.

The speech keyword detector 14 receives a sound signal Snd. For example, the device 10 can include microphone(s) and/or microphone array(s) (not shown) to collect sound, and accordingly supply the digital signal Snd by processing (e.g., analog-to-digital converting) the collected sound. Alternatively, from another remote apparatus (e.g., a wireless microphone, not shown), the device 10 can receive a remotely provided signal (not shown) which contains coded or uncoded sound, and accordingly supply the sound signal Snd by processing the remotely provided signal.

According to a currently running application of the device 10, the speech keyword detector 14 can also obtain a selected keyword list KL[jx] from the keyword lists KL[1] to KL[N2] of the keyword database 16, wherein the target application app[jx] of the selected keyword list KL[jx] matches the currently running application of the device 10. For example, from the device 10 and/or an operation system (OS) of the device 10, the speech keyword detector 14 and/or the keyword database 16 can access a status which indicates the currently running application of the device 10, and can then find (select) the keyword list KL[jx] whose target application app[jx] is equal to the currently running application of the device 10. Applications run by the device 10 can refer to utility programs, services, procedures and/or subroutines executed under control of the OS. A currently running application can refer to a currently active application, a foreground application, a background application and/or an application in focus.

By selecting the keyword list corresponding to currently running application, speech keyword detection can be performed with reference to a context adaptively. For example, regarding a communication application which is responsible for handling incoming call, a corresponding keyword list can include candidates of responding keywords such as "answer" and "reject." For a camera application, its corresponding keyword list can include candidates of shooting keyword like "cheese."

In response to the signal Snd, the speech keyword detector 14 can provide a preliminary keyword detection result Skw according to the selected keyword list KL[jx]. For example, the speech keyword detector 14 can compare incoming sound in the signal Snd with each of the candidate keywords kw[jx,1] to kw[jx,P{jx}] of the selected keyword list KL[jx] to provide the preliminary keyword detection result Skw.

The activity predictor 18 receives a sensor data signal Ssd provided by sensor(s) of the device 10. For example, the device 10 can include sensor(s) to detect movement, acceleration, location, position, angular direction/attitude (e.g., being flipped or tilted), surrounding volume, brightness, and/or force field(s) exerted on the device 10 (e.g., magnetic, electro-magnetic and/or gravity field) as the signal Ssd. Alternatively, from another remote apparatus (e.g., remote sensor(s), not shown), the device 10 can receive a remotely provided signal (not shown) which contains, embeds, and/or coded with sensor data, and accordingly supply the signal Ssd by processing the remotely provided signal.

According to the currently running application of the device 10, the activity predictor 18 obtains a selected activity list AL[ix] from the activity lists AL[1] to AL[N1] of the activity database 20, wherein the target application app[ix] of the selected activity list AL[ix] represents the currently running application of the device 10. For example, from the device 10 and/or OS of the device 10, the activity predictor 18 and/or the activity database 20 obtains a status indicating the currently running application of the device 10, and then selects the activity list AL[ix] associated with the target application app[ix] indicating the currently running application of the device 10. By selecting the activity list associated with the currently running application, activity prediction can be performed in a context adaptive manner. For example, regarding a communication application responsible for handling incoming call, a corresponding activity list can include an activity template of phone raising; for a camera application, its corresponding activity list can include an activity template of keeping steady.

According to the selected activity list AL[ix], the activity predictor 18 processes the signal Ssd to provide an activity prediction result Sap indicating a probability for whether a user is about to give voice keyword. For example, the activity predictor 18 compares the signal Ssd with each of the activity templates at[ix,1] to at[ix,Q{ix}] recorded in the selected activity list AL[ix], and accordingly provide an activity matching result as the activity prediction result Sap.

In one embodiment, each activity template at[i,q] can include standard, typical, representative and/or most frequently sensed result(s) of an indicative activity (movement or state) which happens before or when user is about to give voice keyword. Each sensed result associates with a sensor and is recorded as a reference in the activity template at[i,q]. When the activity predictor 18 generates the result Sap by comparing the sensor data Ssd with each activity template at[ix,q] of the selected activity list AL[ix], for each sensed result of a given kind of sensor included in the sensor data signal Ssd, for example, the activity predictor 18 checks whether the activity template at[ix,q] includes a reference associated with the same kind of sensor; if true, the activity predictor 18 compares the sensed result and the reference respectively included in the signal Ssd and the activity template at[ix,q] of the same kind of sensor, and then reflect comparison result in the signal Sap.

In an embodiment, each activity template at[i,q] includes extracted references, each extracted reference is associated with a sensor, and represents extracting features of a sensed result of an indicative activity. When the activity predictor 18 generates the result Sap by comparing the sensor data signal Ssd with each activity template at[ix,q] of the selected activity list AL[ix], the activity predictor 18 can first extract features of each sensed result included in the sensor data signal Ssd to accordingly generate an extracted sensed result (not shown); for each extracted sensed result of a given kind of sensor included in the signal Ssd, the activity predictor 18 can then find whether the activity template at[ix,q] contains an extracted reference for the same kind of sensor; if true, the activity predictor 18 compares the extracted sensed result and the extracted reference respectively included in the signal Ssd and the activity template at[ix,q] of the same kind of sensor, and then reflect comparison result in the signal Sap.

Figure 2:
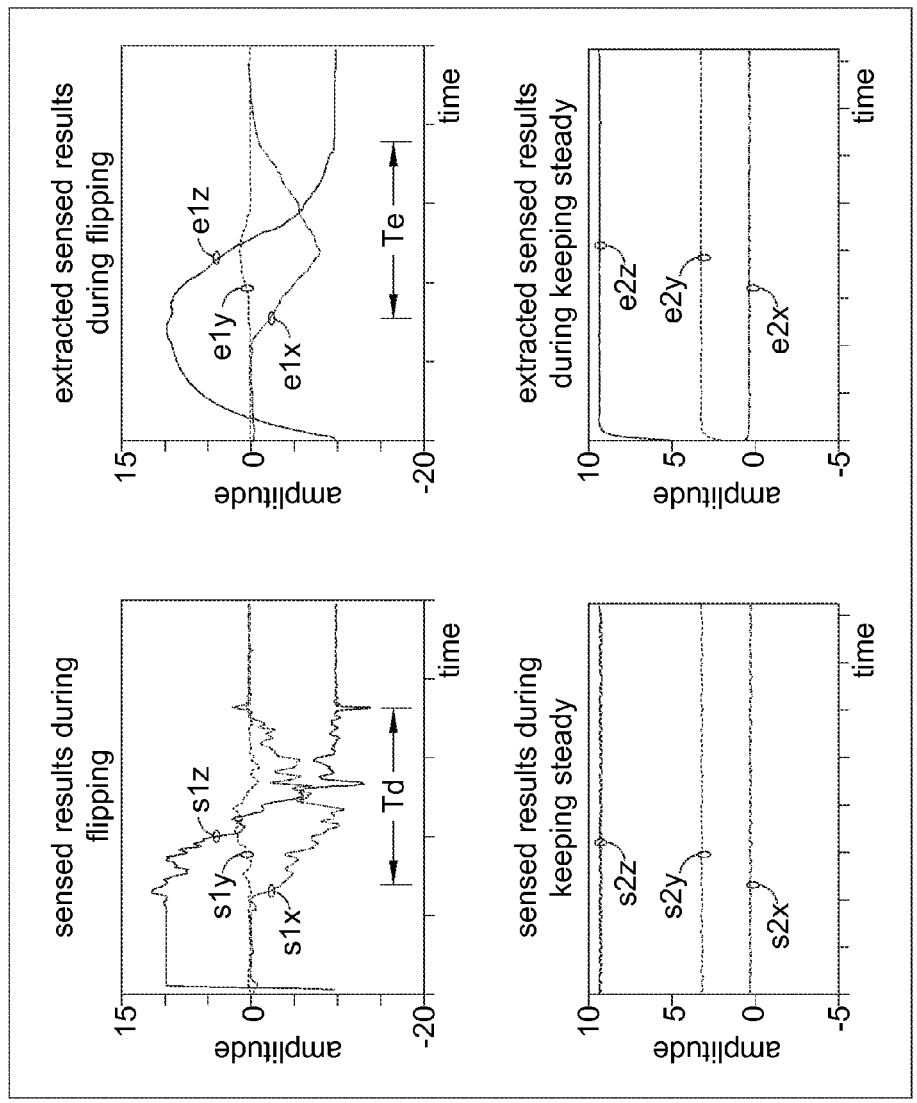
FIG. 2 illustrates sensor data curves of sensed results and extracted sensed results.

Extracting features of a sensed result can be achieved by filtering (e.g., low-pass filtering) the sensed result, calculating statistics of the sensed result, and/or transforming the sensed result to spectrum domain. Please refer to FIG. 2 illustrating examples of sensed results and extracted sensed results; the sensed results are sensed by an accelerometer. As shown in FIG. 2, the sensor data curves s1x, s1y and s1z respectively represent x-axis, y-axis and z-axis acceleration sensed during an activity of flipping, and collectively form a sensed result of the accelerometer. Extracting features (e.g., low-pass filtering) of the curves s1x, s1y and s1z can respectively obtain three extracted sensor data curves e1x, e1y and e1z to collectively form an extracted sensed result. Similarly, the sensor data curves s2x, s2y and s2z respectively represent x-axis, y-axis and z-axis acceleration sensed during an activity of keeping steady. By extracting features of the curves s2x, s2y and s2z, three extracted sensor data curves e2x, e2y and e2z can be obtained respectively. Characteristics of each sensed result and extracted sensed result can be used to distinguish different activities. For example, a transition from amplitudes of +9.8 to −9.8 can be observed in the curve s1z or the curve e1z; accordingly, characteristics such as duration of the transition (e.g., interval Td or Te), zero crossing time and/or amplitude difference of the transition can be utilized to distinguish whether the device is dropped or flipped by the user.

Please refer to FIG. 1 again. The decision maker 22 is coupled to the activity predictor 18 and the speech keyword detector 14, and is capable of processing the activity prediction result Sap and the preliminary keyword detection result Skw to provide a second keyword detection result Sdm, so the device 10 can respond according to the result Sdm. Because the result Sdm is achieved by processing the activity prediction result Sap and the original speech keyword detection result Skw, the result Sdm is more reliable than the result Skw, and so speech keyword detection of the speech keyword detector 14 is enhanced.

Figure 3:
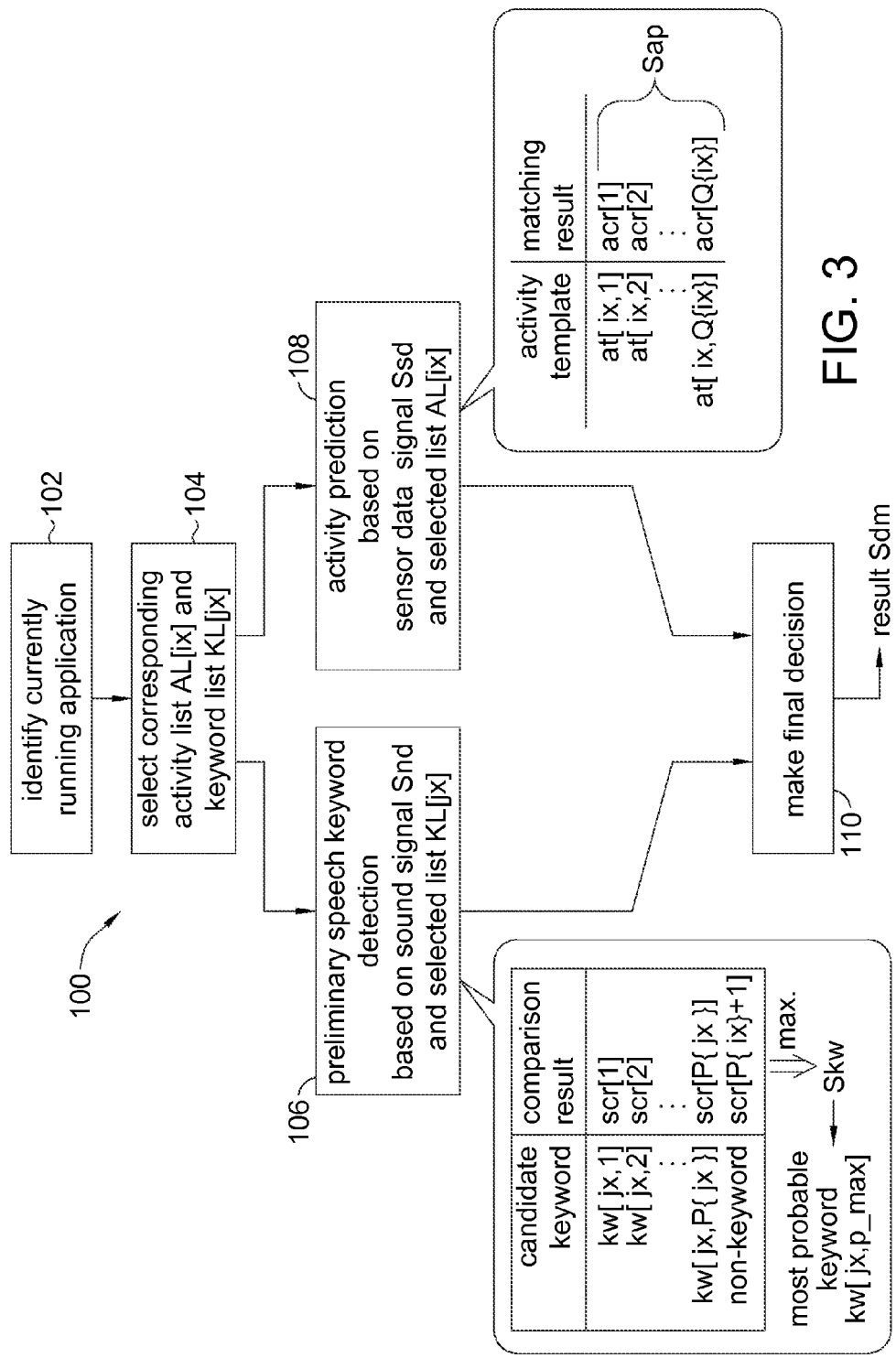
FIG. 3 illustrates a flowchart for sensor assisted speech keyword detection according to an embodiment of the invention.

Along with FIG. 1, please refer to FIG. 3 illustrating a flowchart 100 according to an embodiment of the invention. The system 10 in FIG. 1 can adopt the flowchart 100 to enhance performance of the speech keyword detector 14. The flowchart 100 includes following steps.

Step 102: identify currently running application of the device 10. As previously mentioned, the system 12 can access a status of the device 10 to identify currently running application. For example, the status can be provided by OS of the device 10, and/or by a register of a CPU (central processing unit, not shown) controlling the device 10.

Step 104: select a corresponding activity list AL[ix] and a corresponding keyword list KL[jx] respectively from the activity database 20 and the keyword database 16.

Step 106: by the speech keyword detector 14, perform a preliminary speech keyword detection based on the sound signal Snd and the selected keyword list KL[jx], so as to provide the preliminary keyword detection result Skw. For example, the speech keyword detector 14 can compare sound in the signal Snd (FIG. 1) with the candidate keywords kw[jx,1] to kw[jx,P{jx}] to respectively obtain comparison results scr[1] to scr[P{jx}], each result scr[p] (for p=1 to P{jx}) quantitatively indicates similarity between the signal Snd and the candidate keyword kw[jx,p], and/or indicates probability or likelihood that the signal Snd matches the candidate keyword kw[jx,p]. The speech keyword detector 14 can also obtain an additional comparison result scr[P{jx}+1] to quantitatively indicate probability or likelihood that the signal Snd fail to match any of the candidate keywords kw[jx,1] to kw[jx,P{jx}], i.e., to indicate probability for the signal Snd to be "non-keyword". Then the speech keyword detector 14 can find a maximum one of the results scr[1] to scr[P{jx}+1] and accordingly provide the result Skw. For convenience of discussion, the maximum one of the results scr[1] to scr[P{jx}+1] is denoted as the result scr[p_max] with index p_max being one of the numbers 1 to (P{jx}+1), and the candidate keyword kw[jx,p_max] corresponding to the result scr[p_max] is referred to as a most probable keyword; if the index p_max equals to (P{jx}+1), the most probable keyword kw[jx,p_max] refers to the "non-keyword" situation.

To obtain the results scr[1] to scr[P{jx}+1], the speech keyword detector 14 (FIG. 1) can be a keyword mapper adopting speech processing algorithm(s) based on, e.g., hidden Markov model (HMM), etc. Each of the results scr[1] to scr[P{jx}+1] can be a linear score or a logarithm likelihood.

Step 108: according to the selected activity list AL[ix] and sensor data in the sensor data signal Ssd, compute the activity prediction result Sap by the activity predictor 18 (FIG. 1) to indicate a probability or likelihood for whether a user is about to give voice keyword. For example, the activity predictor 18 compares the signal Ssd with each activity template at[ix,q] of the selected activity list AL[ix] (for q=1 to Q{ix}), and accordingly provide an activity matching result acr[q] to quantitatively indicate similarity between the activity template at[ix,q] and the signal Ssd, and/or probability or likelihood that the signal Ssd matches the activity template at[ix,q]. The results acr[1] to acr[Q{ix}] are then collected to form the result Sap, e.g., the result Sap includes the results acr[1] to acr[Q{ix}]. Because the sensor data signal Ssd can include sensed results of different sensors (or can provide extracted sensed results of different sensors), and each activity template at[ix,q] can include references (or extracted references) of different sensors, the activity predictor 18 can compare each sensed result (or each extracted sensed result) of a sensor with a reference (or an extracted reference) of the same sensor to obtain an individual comparison result, and generate the matching result acr[q] according to comparison results of different sensors.

To obtain the results acr[1] to acr[Q{ix}], the activity predictor 18 can adopt ruled-based algorithm, or more sophisticated algorithm(s) based on Gaussian mixture model, hidden Markov model, support vector machine and/or neural network, etc. Alternatively, the activity predictor 18 can adopt similarity measurement algorithm(s) based on dynamic time warping, etc. Note that steps 106 and 108 can be executed concurrently or in sequential order.

Step 110: by the decision maker 22 (FIG. 1), make a final decision to provide the keyword detection result Sdm according to the preliminary keyword detection result Skw and the activity prediction result Sap. The result Sdm can be a probability, a score and/or a logarithm likelihood quantitatively measuring how likely the most probable keyword kw[jx,p_max] of step 106 is actually said in context of currently running application and user activity.

The device 10 can periodically repeat the flowchart 100 to perform the sensor assisted speech keyword detection. Alternatively, the device 10 can execute the flowchart 100 when needed, e.g., when user instructs.

In one embodiment, the result Sdm is obtained by checking if the result Skw satisfies a first condition and the result Sap satisfies a second condition. For example, the first condition can be satisfied if the result Skw is greater than a first threshold, and the second condition can be satisfied if each of the results acr[1] to acr[Q{ix}] in the result Sap is greater than a second threshold. Alternatively, the second condition is: if a sum (or a linear combination) of the results acr[1] to acr[Q{ix}] is greater than a second threshold. Alternatively, the second condition is: if a statistic property (e.g., maximum, minimum, mean, etc.) of the results acr[1] to acr[Q{ix}] is greater than a second threshold. Preferably, when both the first and second conditions are satisfied, the decision maker 22 (FIG. 1) can determine that the mostly probable keyword kw[jx,p_max] is said and reflect the affirmative with the result Sdm, so the device 10 can accordingly respond, e.g., perform operations associated with the keyword kw[jx,p_max]. On the other hand, if one of the first and second conditions is not satisfied (or the determined keyword kw[jx,p_max] represents "non-keyword"), then the decision maker 22 can reflect negation with the result Sdm, so operation the device 10 will not be affected.

In an embodiment, the result Sdm is obtained by computing a linear combination of the results acr[1] to acr[Q{ix}] and Skw, and comparing whether the linear combination is greater than a predefined threshold; if true, the decision maker 22 determines that the most probable keyword kw[jx,p_max] is heard, otherwise the decision maker 22 determines that the keyword kw[jx,p_max] is not recognized.

In other embodiments, the decision maker 22 can adopt a probability fusion algorithm based on, e.g., Dempster-Shafer theory, or a machine learning algorithm based on, e.g., Gaussian mixture model, to process the results Skw and acr[1] to acr[Q{ix}] and accordingly achieve a more reliable result Sdm. The aforementioned sophisticated algorithms can apply arbitrary number of probabilities as inputs and accordingly provide a conclusive probability as an output, so it offers a flexible solution to integrate information respectively provided by the results Skw and acr[1] to acr[Q{ix}], since the number Q{ix} can be different under different application contexts. Alternatively, different algorithms can be combined to generate the result Sdm. For example, the decision maker 22 adopts a first algorithm to process the results acr[1] to acr[Q{ix}] to accordingly obtain a first result, and adopts a second algorithm to process the first result and the result Skw to accordingly obtain the result Sdm.

Figure 4:
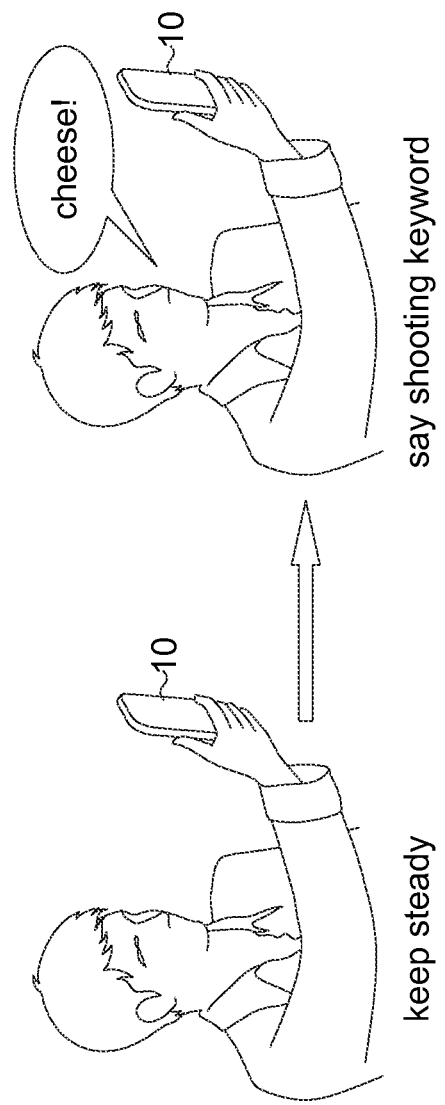
FIG. 4 to FIG. 7 illustrate operation examples of sensor assisted speech keyword detection according to an embodiment of the invention.

Along with FIG. 1, please refer to FIG. 4 to FIG. 7 illustrating operation examples of the device 10 (FIG. 1) Assume the device 10 is a smart mobile phone for FIG. 4 to FIG. 7. FIG. 4 demonstrates a scenario of taking photo. When the user wants to take a photo with the device 10, a natural, convenient and intuitive action sequence for user is: activating camera application of device 10, keeping the device 10 steady, and saying voice shooting keyword, e.g., "cheese". Accordingly, to implement a sensor assisted voice control photo shooting, an activity list (FIG. 1) corresponding to the camera application can include an activity template representing the indicative activity of keeping steady, and a keyword list corresponding to the camera application can include candidate voice shooting keyword(s).

The sensor assisted voice control photo shooting operates as follows. When the user activates the camera application of the device 10 to prepare for photo shooting, the activity predictor 18 (FIG. 1) of the device 10 leverages sensor data to detect whether the indicative activity of keeping steady occurs. When the user is keeping the device 10 steady, the activity predictor 18 will reflect occurrence of the indicative activity, so the device 10 can predict that user is going to say the voice shooting keyword to trigger photo shooting, and the device 10 allows the voice shooting keyword to be recognized more easily. For example, the decision maker 22 (FIG. 1) increases sensitivity of identifying the voice shooting keyword, hence the voice shooting keyword can be recognized even when it is said faintly or in noisy environment. Once the decision maker 22 reflects that the voice shooting keyword is recognized, the device 10 can respond by taking the shot. Contrarily, when indicative activity of keeping steady is not detected, the user is unlikely to say the voice shooting keyword, so the device 10 can avoid erroneous recognition of the voice shooting keyword. For example, the decision maker 22 decreases sensitivity of identifying the voice shooting keyword.

Figure 5:
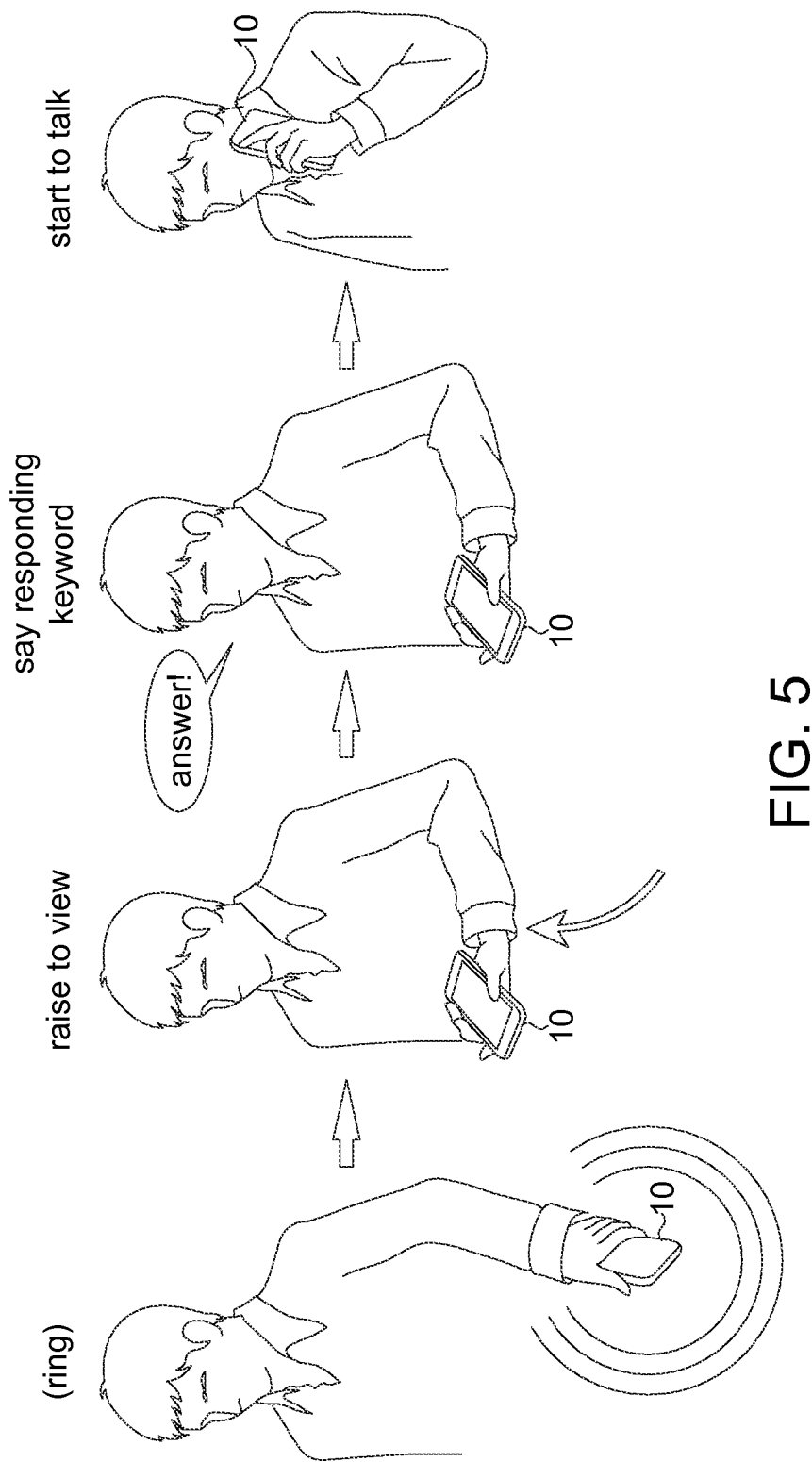

FIG. 5 demonstrates a scenario of responding an incoming call.

When the device 10 receives an incoming call and rings for user's attention, a natural and friendly action sequence for user is: raising the device 10 to view information about the incoming call (e.g., who is calling), determining how to respond (e.g., to answer the call, to reject it or to ignore it), and accordingly saying a voice responding keyword, e.g., "answer," "reject," "ignore," or "mute." In this embodiment, to implement a sensor assisted voice control call responding, an activity list corresponding to a communication application responsible for handling incoming call can include an activity template recording the indicative activity of phone raising, and a keyword list corresponding to the communication application can include candidate voice responding keywords e.g., "answer," "reject," "ignore," or "mute." For example, when the user is in a meeting and even giving a speech, he can say "mute" to mute the device 10 quickly during the whole meeting.

The sensor assisted voice control call responding operates as follows. When the application handling incoming call receives an incoming call, the activity predictor 18 is instructed to detect whether the indicative activity of phone raising occurs. When the user does raise the device 10, the activity predictor 18 reflects occurrence of the indicative activity, so the device 10 can predict that user is going to say the voice responding keyword, and allows the voice responding keywords to be recognized more easily. For example, the decision maker 22 lowers a threshold for confirming positive recognition of the voice responding keyword, so the voice responding keyword can be recognized even when it is said faintly or in noisy environment. Once the decision maker 22 reflects that the voice responding keyword is recognized, the device 10 can react accordingly, e.g., accept, reject, ignore or mute the call. Contrarily, when the indicative activity of phone raising is not detected, the user is unlikely to say the voice responding keyword, so the device 10 can avoid erroneous recognition of the voice responding keyword. For example, the decision maker 22 increases the threshold for confirming recognition of the voice responding keywords.

Figure 6:
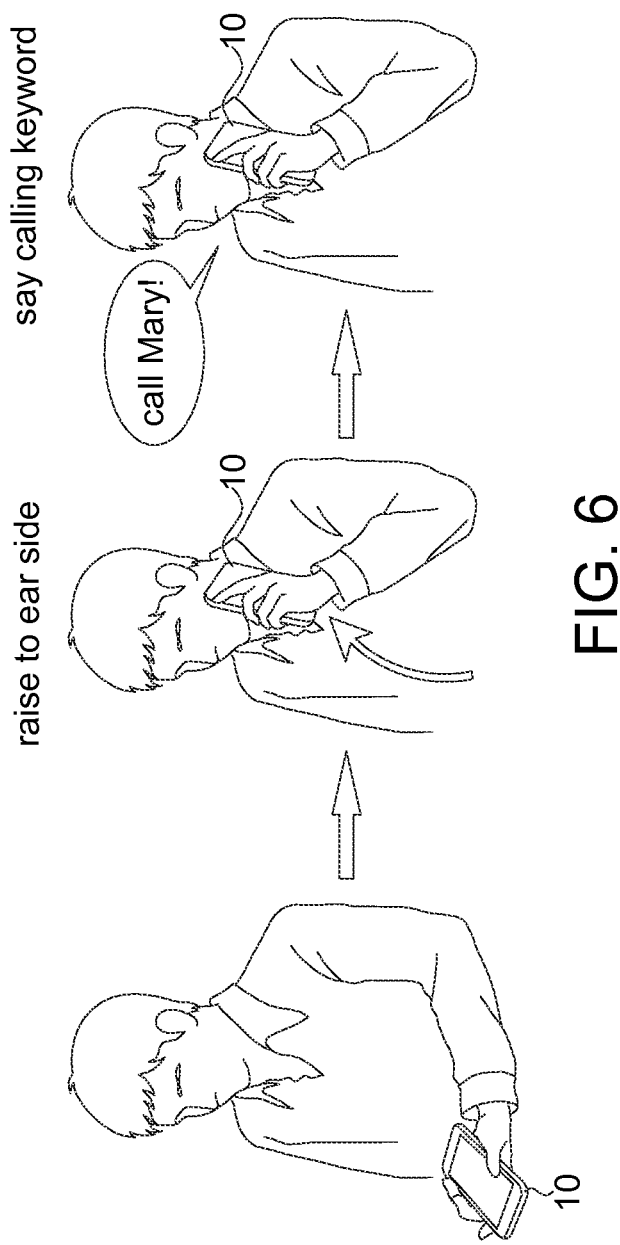

FIG. 6 demonstrates a scenario of making an outgoing call. When the user wants to make an outgoing call, an intuitive and convenient action sequence is: raising the device 10 to ear side, and giving a name of the callee, e.g., "call Mary". To implement a sensor assisted voice control phone calling, an activity list corresponding to a communication application responsible for handling outgoing call can include an activity template recording the indicative activity of raising phone to ear side, and a keyword list corresponding to the communication application can include candidate voice calling keywords related to names of possible calling objects, e.g., names listed in the address book and/or contact list.

The sensor assisted voice control calling operates as follows. When the user activates the communication application to prepare for making an outgoing call or when the device 10 is automatically running the communication application as a default application executed when no other application is running, the activity predictor 18 is informed to detect whether the indicative activity of phone raising occurs. When the user does raise the device 10 to ear side, the activity predictor 18 reflects occurrence of the indicative activity, so the device 10 can predict that user is going to say the voice calling keyword, and therefore allows the voice calling keyword to be recognized more easily. For example, the decision maker 22 increases a tendency to admit positive recognition of the voice responding keyword, so the voice calling keyword can be recognized even when it is said faintly or in noisy environment. Once the decision maker 22 reflects that the voice calling keyword is recognized, the device 10 makes the call according to the voice calling keyword. On the other hand, when the indicative activity is not detected, the user is unlikely to say the voice calling keyword, so the device 10 can avoid erroneous recognition of the voice calling keyword; equivalently, the decision maker 22 can lower the tendency to admit recognition of the voice responding keyword.

Figure 7:
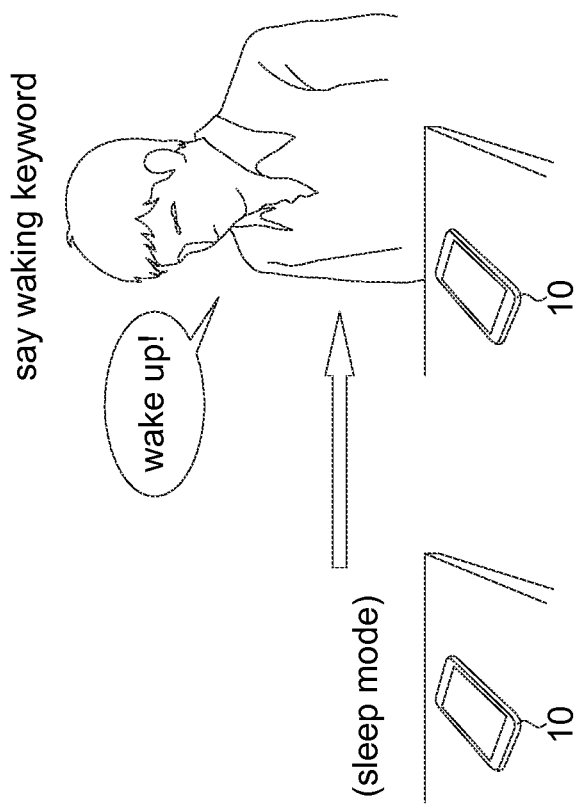

FIG. 7 demonstrates a scenario of waking up a sleep phone and/or unlocking a locked phone. For power saving, modern smart phone enters a sleep mode in which only basic functions are maintained, and other functions (e.g., screen display) are turned off. For user's convenience, it is desired to wake up a phone from the sleep mode simply by user's voice, instead of touching screen or pushing button. Thus, the user can wake up the sleep phone by saying a keyword, e.g., "wake up." To accordingly implement a sensor assisted voice control phone waking, an activity list corresponding to a standby application responsible for handling phone waking can include activity template(s) recording the indicative state(s) in which the device 10 is kept stable, quiet and being hand-held, and a keyword list corresponding to the standby application can include candidate voice waking keyword such as "wake up."

The sensor assisted voice control phone waking operates as follows. When the device 10 goes in a sleep mode and the standby application is running, the activity predictor 18 is informed to detect whether any of the indicative states occurs. When the device 10 does enter one of the indicative states, the activity predictor 18 reflects entering of the indicative state, so the device 10 can expect the voice waking keyword, and therefore allows the voice waking keyword to be recognized more easily. For example, the decision maker 22 tends to accept positive recognition of the voice waking keyword, so the voice waking keyword can be recognized even when it is said faintly or in noisy environment. Once the decision maker 22 reflects that the voice waking keyword is recognized, the device 10 can leave the sleep mode. On the other hand, when none of the indicative states is detected, e.g., when the device 10 is carried in a backpack, the user is unlikely to say the voice waking keyword, so the device 10 can avoid erroneous recognition of the voice waking keyword; equivalently, the decision maker 22 tends to reject or ignore recognition of the voice waking keyword.

Although FIG. 4 to FIG. 7 only illustrate a limit number of examples, it should be noted that the sensor assisted speech keyword detection of the invention can actually provide an unattended, natural, convenient, intuitive, friendly, accurate and reliable voice control function seamlessly in user's daily life. For example, the user can wake up the device by voice (FIG. 7) and then take photo by voice (FIG. 4), make outgoing calls by voice (FIG. 6) and/or respond incoming calls by voice (FIG. 5).

Figure 8:
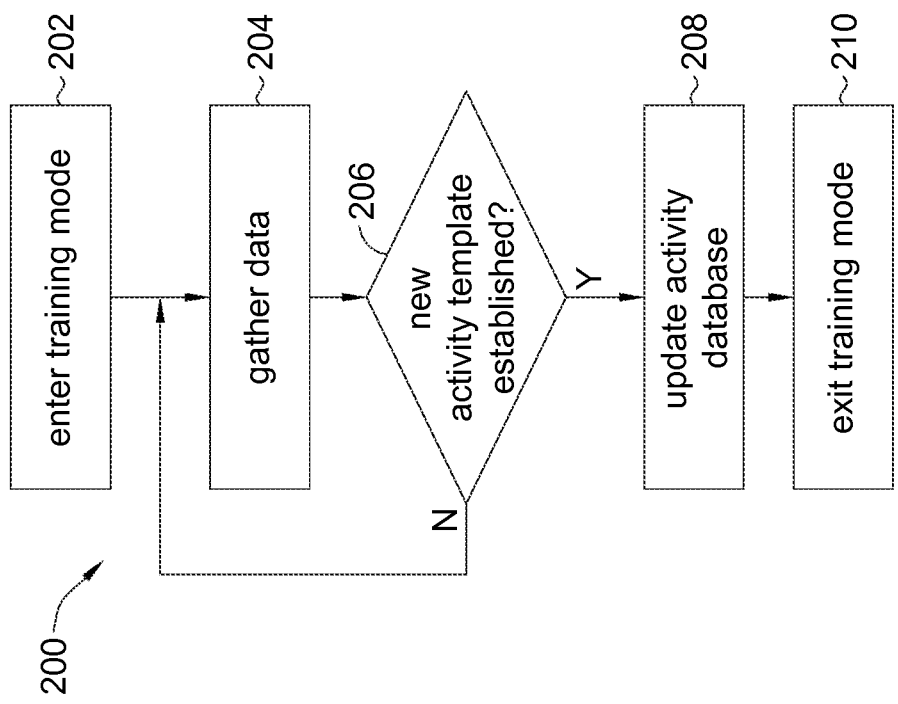
FIG. 8 illustrates a flowchart to modify the activity database shown in FIG. 1.

The activity list(s) and corresponding activity template(s) in the activity database 20 (FIG. 1) can be pre-established by a manufacturer or a designer of the device 10. Furthermore, the activity database 20 can be modified according to user's individual need. For example, the system 12 can allow user to add, delete, edit, move, and/or replace activity template and activity list. Along with FIG. 1, please refer to FIG. 8 illustrating a flowchart 200 according to an embodiment of the invention. The device 10 can adopt the flowchart 200 to update the activity database 20 by adding a new activity template or modifying an existed activity template with a new one. The flowchart 200 includes the following steps.

Step 202: by the device 10, enter a training mode to prepare for user's modification when the user wants to manually update the activity database 20. The device 10 can then prompt the user to specify an element (e.g., an activity list and/or an activity template) to be modified, and how the element is going to be modified (e.g., by adding or replacing). When the device 10 enters the training mode, the device 10 can first stop the flowchart 100 (FIG. 3).

Step 204: by the device 10, gather sensor data when the user performs a new activity intended to be added to the activity database 20 as a new activity template, or intended to replace an existed activity template. In an embodiment, the device 10 can extract features of the sensor data, e.g. by the activity predictor 18 from the sensor data signal Ssd.

Step 206: to establish a statistically reliable activity template, the device 10 prompt the user to repeat the new activity several times; each time when the user repeats the new activity, the device 10 iterates to step 204. When the device 10 gathers sufficient sensor data to construct a reliable new activity template, the device 10 proceeds to step 208. If gathered data is not satisfactory, the flowchart 200 iterates to step 204.

Step 208: by the device 10, update the activity data base, e.g., add the new activity template or replace an existed activity template with the new activity template, according to gathered sensor data.

Step 210: exit the training mode, then the device 10 can restore the suspended flowchart 100 (step 202), or enter other mode.

In addition to the activity database 20, the keyword database 16 can also be modified by the user according to a flowchart similar to the flowchart 200.

Because speech keyword detection is expected to monitor keyword anytime without user's cue, power consumption is further considered, especially for mobile devices which rely on battery for power supply. Voice detection can be applied for evaluating how informative incoming sound is, so as to enable speech keyword detection when incoming sound appears to be informative, and otherwise to disable speech keyword detection for power saving.

Figure 9:
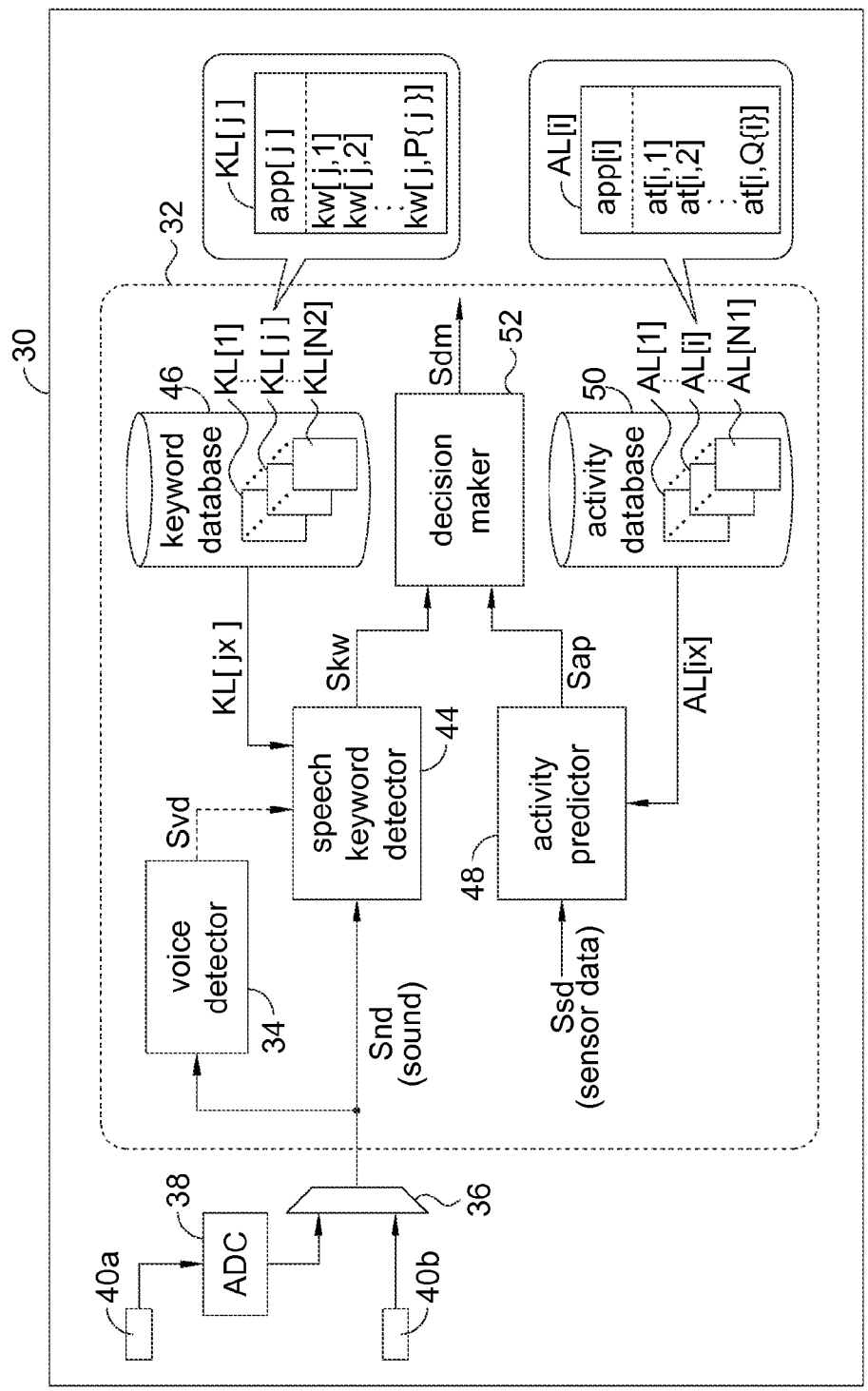
FIG. 9 illustrates a system for speech keyword detection according to an embodiment of the invention.

Along with FIG. 1, please refer to FIG. 9 illustrating a low-power sensor assisted speech keyword detection system 32 integrated in a device 30. Similar to the system 12 of FIG. 1, the system 32 in FIG. 9 includes a speech keyword detector 44, a keyword database 46, an activity predictor 48, an activity database 50 and a decision maker 52. Furthermore, the system 32 includes a voice detector 34. The device 30 includes a multiplexer 36, an analog-to-digital converter (ADC) 38 and two terminals 40a and 40b. If the device 30 is equipped with analog microphone(s) (not shown), the analog microphone(s) can be connected to the terminal 40a, so an analog sound signal (not shown) provided by the analog microphone(s) can be relayed to the ADC 38 to be converted to a digital sound signal (not shown), which is then conducted to become a digital sound signal Snd by the multiplexer 36. On the other hand, If the device 30 is equipped with digital microphone(s) (not shown), the digital microphone(s) can be connected to the terminal 40b, so a digital sound signal (not shown) provided by the digital microphone(s) can be conducted to become the signal Snd by the multiplexer 36. The system 32 also receives a sensor data signal Ssd provided by sensor(s) of the device 30.

Operation of the speech keyword detector 44, the activity predictor 48 and the decision maker 52 are similar to that of the speech keyword detector 14, the activity predictor 18 and the decision maker 22 (FIG. 1). Cooperation of the speech keyword detector 44, the activity predictor 48 and the decision maker 52 as well as the databases 46 and 50 can implement sensor assisted speech keyword detection of the invention by following the flowchart 100 (FIG. 3).

The keyword database 46 is coupled to the speech keyword detector 44, and includes a number N2 of keyword lists KL[1] to KL[N2]. Each keyword list KL[j] (for j=1 to N2) is associated with a target application app[j] including an amount P{j} of candidate keywords kw[j,1] to kw[j,P{j}].

The activity database 50 is coupled to the activity predictor 48, and includes a number N1 of activity lists AL[1] to AL[N1]; each activity list AL[i] (for i=1 to N1) is associated with a target application app[i] including an amount Q{i} of activity templates at[i,1] to at[i,Q{i}].

The speech keyword detector 44 obtains a selected keyword list KL[jx] from the keyword lists KL[1] to KL[N2] of the keyword database 46, wherein the target application app[jx] of the selected keyword list KL[jx] matches a currently running application of the device 30. In response to the signal Snd, the speech keyword detector 44 provides a preliminary keyword detection result Skw according to the selected keyword list KL[jx].

The activity predictor 48 obtains a selected activity list AL[ix] from the activity lists AL[1] to AL[N1] of the activity database 50, wherein the target application app[ix] of the selected activity list AL[ix] matches the currently running application of the device 30. Based on the selected activity list AL[ix], the activity predictor 48 can process the signal Ssd to provide an activity prediction result Sap indicating a probability for whether a user is about to give voice keyword.

The decision maker 52 is coupled to the activity predictor 48 and the speech keyword detector 44, for processing the results Sap and Skw to provide a second keyword detection result Sdm, so the device 30 can react according to the result Sdm.

The voice detector 34 is coupled to the speech keyword detector 44, and is capable of evaluating informativeness based on, e.g., SNR, of the sound signal Snd, and accordingly determining whether to enable the speech keyword detector 44. For example, if informativeness of the signal Snd is low (e.g. below an informativeness threshold, not shown), the voice detector 34 can disable (inactivate) the speech keyword detector 34, for example, keep the speech keyword detector 44 in a low-power (idle) mode. On the other hand, if informativeness of the signal Snd is high (e.g. greater than the informativeness threshold), the voice detector 34 can enable (activate) the speech keyword detector 44, for example, wake up the speech keyword detector 44 to operate in a normal (fully-functional) mode. As shown in FIG. 9, the voice detector 34 provides a signal Svd to selectively enable the speech keyword detector 44.

When the speech keyword detector 44 is disabled, the activity predictor 48 and the decision maker 52 are preferably disabled as well as the databases 46 and 50. When the speech keyword detector 44 is enabled, the activity predictor 48 and the decision maker 52 (as well as the databases 46 and 50) are enabled to cooperate with the speech keyword detector 44 for sensor assisted speech keyword detection. Alternatively, the activity predictor 48 and the decision maker 52 also receive the signal Svd to be enabled or disabled.

Figure 10:
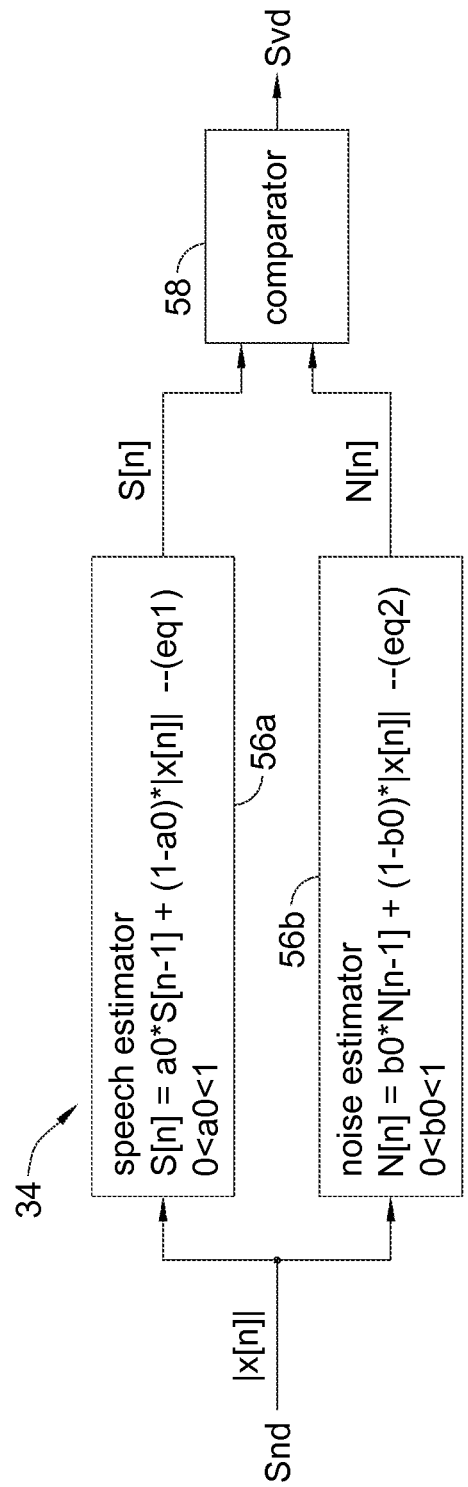
FIG. 10 illustrates an embodiment of the voice detector shown in FIG. 9.

Please refer to FIG. 10 illustrating an embodiment of the voice detector 34. The voice detector 34 includes a speech estimator 56a, a noise estimator 56b and a comparator 58 coupled to the speech estimator 56a and the noise estimator 56b. The speech estimator 56a is capable of providing a sequence S[.] in response to volume of the signal Snd; as each sample of the signal Snd is denoted by a value x[n], volume of the signal Snd can be denoted by an absolute value |x[n]|. The noise estimator 56b is capable of providing a sequence N[.] also in response to volume of the signal Snd.

As shown in equation eq1 of FIG. 10, the speech estimator 56a is capable of computing a current sample S[n] of the sequence S[.] as a weighted sum of a current volume |x[n]| of the signal Snd and a preceding sample S[n−1] of the sequence S[.], i.e., computing the current sample S[n] of the sequence S[.] by summing a product a0*S[n−1] and a product (1−a0)*|x[n]|, wherein the product a0*S[n−1] is a result of multiplying the preceding sample S[n−1] with a weighting a0, and the product (1−a0)*|x[n]| is a result of multiplying the current volume |x[n]| with a complementary weighting (1−a0). In an embodiment, the weighting a0 can be greater than 0 and less than 1.

As shown in equation eq2 of FIG. 10, the noise estimator 56b is capable of computing a current sample N[n] of the sequence N[.] as a weighted sum of the current volume |x[n]| and a preceding sample N[n−1] of the sequence N[.], i.e., computing the current sample N[n] of the sequence N[.] by summing a product b0*N[n−1] and a product (1−b0)*|x[n]|, wherein the product b0*S[n−1] is a result of multiplying the preceding sample N[n−1] with a weighting b0, and the product (1−b0)*|x[n]| is a result of multiplying the current volume |x[n]| with a complementary weighting (1−b0). In an embodiment, the weighting b0 can be greater than 0 and be less than 1.

In one embodiment, the weighting a0 is less than the weighting b0. Accordingly, the sequence S[.] tends to reflect current volume of the incoming sound, and the sequence N[.] tends to reflect past average volume of the incoming sound. Thus, the sequence S[.] indicates informative signal, e.g., voice, contained in the signal Snd while the sequence N[.] indicates background noise in the signal Snd. The comparator 58 compares S[.] and N[.] to indicate the informativeness of the signal Snd, and accordingly provide the signal Svd to control the speech keyword detector 44. For example, if an absolute difference |S[n]−N[n]| is greater than an informativeness threshold (not shown), then the comparator 58 of the voice detector 34 reflects a high informativeness in the signal Svd to enable the speech keyword detector 44. Contrarily, if the absolute difference |S[n]−N[n]| is less than the informativeness threshold, then the comparator 58 of the voice detector 34 reflects a low informativeness in the signal Svd to disable the speech keyword detector 44 because performing speech keyword detection on noisy sound only leads to error.

Figure 11:
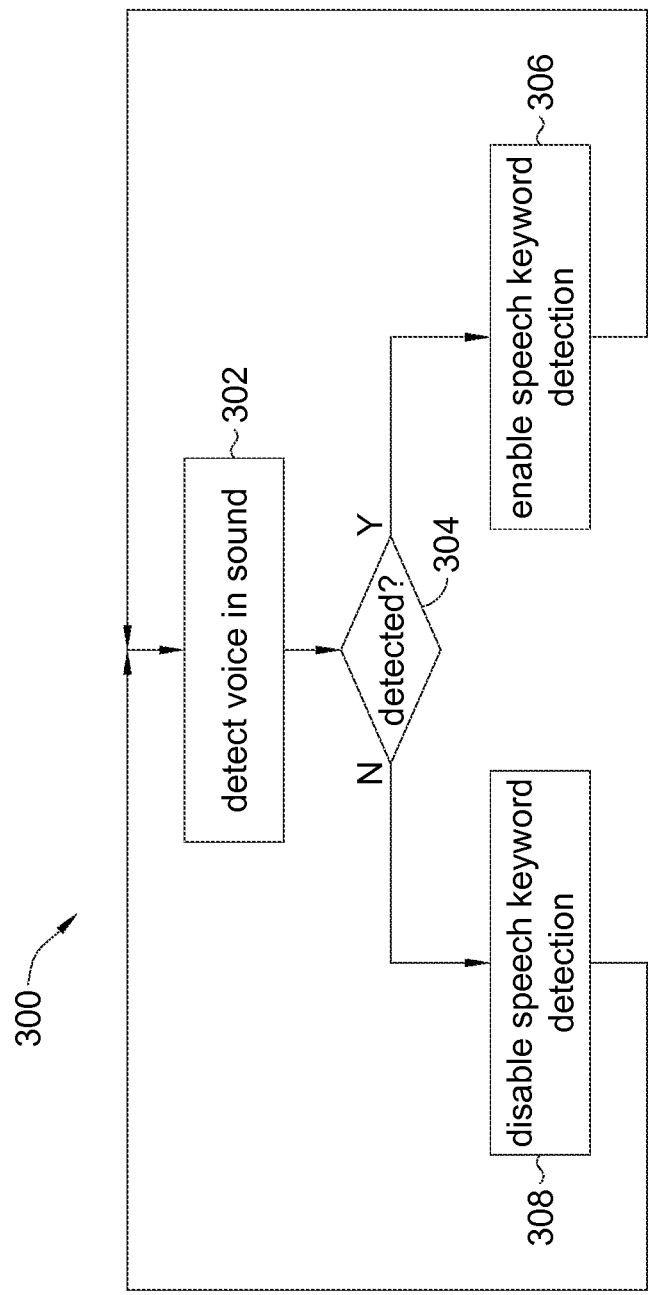
FIG. 11 illustrates a flowchart for low-power sensor assisted speech keyword detection.

Along with FIG. 9, please refer to FIG. 11 illustrating a flowchart 300 of selective speech keyword detection according to an embodiment of the invention. With the voice detector 34, the system 32 (FIG. 9) can adopt flowchart 300 for power saving without compromising expected function of speech keyword detection. Major steps of the flowchart 300 can be described as follows.

Step 302: by the voice detector 34, detect voice in sound; e.g., evaluate informativeness of the signal Snd.

Step 304: if voice is detected (informativeness is high), proceed to step 306, otherwise proceed to step 308.

Step 306: perform speech keyword detection, e.g., the sensor assisted speech keyword detection of the flowchart 100 (FIG. 3). Although the voice detector 34 is utilized along with sensor assisted speech keyword detection of the speech keyword detector 44, the activity predictor 48 and the decision maker 52 as shown in FIG. 9, the voice detector 34 can also be utilized along with a simpler speech keyword detection which is implemented only by a preliminary speech keyword detector (e.g., the speech keyword detector 44) without assistance of sensor data. Such simpler speech keyword detection can also adopt the flowchart 300, and the speech keyword detection enabled in step 306 is implemented by operation of the preliminary speech keyword detector. After step 306, the flowchart 300 can iterate to step 302.

Step 308: disable speech keyword detection, e.g., stop operation of the speech keyword detector 44 (FIG. 9). Operation of the activity predictor 48 and the decision maker 52, as well as the keyword database 46 and the activity database 50, can also be stopped. After step 308, the flowchart 300 can iterate to step 302.

In an embodiment, the voice detector 34 in FIG. 10 can be implemented by a dedicated hardware, e.g., circuit. The speech keyword detector 44, the activity predictor 48 and/or the decision maker 52 (FIG. 9) can also be implemented by dedicated hardware, or by a digital signal processor (DSP). The DSP can execute software and/or firmware to implement functions of the speech keyword detector 44, the activity predictor 48 and/or the decision maker 52. The keyword database 46 and the activity database 50 can be implemented by programmable nonvolatile memory. A modern device may include a CPU and a DSP. The CPU is responsible for executing OS and applications, and the DSP is responsible for processing multimedia (e.g., coding and/or decoding of audio and/or video). Under such architecture, components of the sensor assisted speech keyword detection system can be implemented in the DSP, so the sensor assisted speech keyword detection can operate without involvement of the CPU, and accordingly lower power consumption of the sensor assisted speech keyword detection. Alternatively, only the voice detector 34 by the dedicated hardware is arranged to operate in most of the time to selectively enable required circuit. For example, when a smart phone increases a sensitivity of voice detection as disclosed by the invention, the smart phone can prompt the user by an LED with different color, e.g. orange, to complete a desired operation by voice control under dark screen. Alternatively, the screen can show an indicative logo within a partial area of a full screen to prompt the user. Alternatively, only a gyro sensor is arranged to always or periodically operate to selectively enable required circuit since the gyro consumes very low power. According to a plurality of operations defined by the activity database and the keyword database, the smart phone may operate under dark screen or require no full illuminating of the screen. Thus, the power consumption can be negligible or even reduced to realize the concept disclosed by the invention.

To sum up, the invention leverages sensor data provided by sensor(s) of device to obtain additional information for enhancing speech keyword detection, so as to implement a more convenient, friendly, reliable and accurate voice control. Persons skilled in the art may make possible modifications without departing from the scope disclosed by the invention. For example, dark screen touch control can be incorporated with the invention to further enhance the convenience of device control.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A system for speech keyword detection of a device, comprising:
a voice detector for evaluating informativeness of a received incoming sound according to a current volume and a past average volume of the incoming sound, so as to selectively enable the speech keyword detector according to the informativeness;
a speech keyword detector for generating a most probable keyword as a preliminary keyword detection result according to the received incoming sound;
an activity predictor for obtaining sensor data provided by a plurality of sensors, and processing the sensor data to provide an activity prediction result indicating occurrence of indicative activities which reflect whether a user is about to give a voice keyword; and
a decision maker coupled to the activity predictor and the speech keyword detector, for providing a keyword detection result by executing:
when the activity prediction result indicates absence of indicative activities, lowering a sensitivity to admit that the most probable keyword is said, so as to suppress false alarm error; and
when the activity prediction result indicates presence of indicative activities, raising the sensitivity to admit that the most probable keyword is said, so as to suppress miss error;
wherein the voice detector comprises:
a first estimator for computing a current sample of a first sequence as a weighted sum of the current volume of the incoming sound and a preceding sample of the first sequence;
a second estimator for computing a current sample of a second sequence as a weighted sum of the current volume of the incoming sound and a preceding sample of the second sequence; and
a comparator, coupled to the first estimator and the second estimator, comparing the first sequence and the second sequence to indicate the informativeness of the incoming sound.

2. The system of claim 1 further comprising:
an activity database comprising a plurality of activity lists; each activity list being associated with a target application, and comprising a plurality of activity templates,
wherein the activity predictor executes:
obtaining a selected one of the activity lists, wherein the target application associated with the selected activity list matches a currently running application of the device; and
comparing the sensor data with each activity template of the selected activity list to provide the activity prediction result.

3. The system of claim 1 further comprising:
an activity database comprising a plurality of activity lists; each activity list being associated with a target application, and comprising a plurality of activity templates,
wherein the activity predictor executes:
obtaining a selected one of the activity lists, wherein the target application associated with the selected activity list matches a currently running application of the device;
providing extracted data by extracting features of the sensor data;
and
comparing the extracted data with each activity template of the selected activity list to provide the activity prediction result.

4. The system of claim 1 further comprising:
a keyword database comprising a plurality of keyword lists; each keyword list being associated with a target application, and comprising a plurality of candidate keywords,
wherein the speech keyword detector executes:
obtaining a selected one of the keyword lists, wherein the target application associated with the selected keyword list matches a currently running application of the device; and
comparing the received incoming sound with each candidate keyword of the selected keyword list to provide the preliminary keyword detection result.

5. The system of claim 1, wherein:
the first estimator computes the current sample of the first sequence by summing a first product and a second product, the first product multiplying the preceding sample of the first sequence with a first weighting, and the second product multiplying the current volume of the incoming sound with a first complementary weighting; and
the second estimator computes the current sample of the second sequence by summing a third product and a fourth product, the third product multiplying the preceding sample of the second sequence with a second weighting, and the fourth product multiplying the current volume of the incoming sound with a second complementary weighting.

6. The system of claim 5, wherein the first weighting is less than the second weighting.

7. The system of claim 1, wherein the decision maker applies a probability fusion algorithm to process the activity prediction result and the preliminary keyword detection result for providing the keyword detection result.

8. The system of claim 1, wherein the decision maker adopts a machine learning algorithm to process the activity prediction result and the preliminary keyword detection result for proving the keyword detection result.

9. The system of claim 1, wherein the decision maker calculates a linear combination of the activity prediction result and the preliminary keyword detection result as the keyword detection result.

10. The system of claim 1, wherein the sensors include at least one of the following: an accelerometer, a gyroscope, a magnetometer, a barometer, a proximity sensor, a light sensor, a touch screen, a receiver of a positioning system, a wireless receiver and a camera.

11. A method for speech keyword detection of a device, comprising:
performing a voice detection by evaluating informativeness of a received incoming sound according to a current volume and a past average volume of the incoming sound, so as to selectively enable the speech keyword detection according to the informativeness;
generating a most probable keyword as a preliminary keyword detection result according to the received incoming sound;
obtaining sensor data provided by a plurality of sensors;
according to the sensor data, computing an activity prediction result indicating occurrence of indicative activities which reflect whether a user is about to give voice keyword; and computing a keyword detection result by executing:
when the activity prediction result indicates absence of indicative activities, lowering a sensitivity to admit that the most probable keyword is said, so as to suppress false alarm error; and
when the activity prediction result indicates presence of indicative activities, raising the sensitivity to admit that the most probable keyword is said, so as to suppress miss error;
wherein the step of performing the voice detection comprises:
computing a current sample of a first sequence as a weighted sum of the current volume of the incoming sound and a preceding sample of the first sequence;
computing a current sample of a second sequence as a weighted sum of the current volume of the incoming sound and a preceding sample of the second sequence; and
comparing the first sequence and the second sequence to indicate the informativeness of the incoming sound.

12. The method of claim 11 further comprising:
providing an activity database which comprises a plurality of activity lists; each activity list being associated with a target application, and comprising a plurality of activity templates;
identifying currently running application of the device;
selecting one of the activity lists by comparing the currently running application with each target application of each activity list; and
comparing the sensor data with each activity template of the selected activity list to provide the activity prediction result.

13. The method of claim 11 further comprising:
providing an activity database which comprises a plurality of activity lists; each activity list being associated with a target application, and comprising a plurality of activity templates;
identifying currently running application of the device;
by comparing the currently running application with each target application of each activity list, selecting one of the activity lists;
providing extracted data by extracting features of the sensor data;
comparing the extracted data with each activity template of the selected activity list and accordingly providing an activity matching result to be included in the activity prediction result.

14. The method of claim 11 further comprising:
providing a keyword database which comprises a plurality of keyword lists; each keyword list being associated with a target application, and comprising a plurality of candidate keywords;
identifying currently running application of the device;
selecting one of the keyword lists by comparing the currently running application with each target application of each keyword list; and
providing the preliminary keyword detection result by comparing the received incoming sound with each candidate keyword of the selected keyword list.

15. The method of claim 11, wherein:
the step of computing the current sample of the first sequence by comprises summing a first product and a second product, the first product multiplying the preceding sample of the first sequence with a first weighting, and the second product multiplying the current volume of the incoming sound with a first complementary weighting; and
the step of computing the current sample of the second sequence comprises summing a third product and a fourth product, the third product multiplying the preceding sample of the second sequence with a second weighting, and the fourth product multiplying the current volume of the incoming sound with a second complementary weighting.

16. The method of claim 15, wherein the first weighting is less than the second weighting.

17. The method of claim 11, wherein computing the keyword detection result comprises: adopting a probability fusion algorithm to process the activity prediction result and the preliminary keyword detection result.

18. The method of claim 11, wherein computing the keyword detection result comprises: adopting a machine learning algorithm to process the activity prediction result and the preliminary keyword detection result.

19. The method of claim 11, wherein the step of computing the second keyword detection result calculates a linear combination of activity prediction result and the preliminary keyword detection result as the keyword detection result.

20. The method of claim 11, wherein the sensors includes at least one of the following: an accelerometer, a gyroscope, a magnetometer, a barometer, a proximity sensor, a light sensor, a touch screen, a receiver of a positioning system, a wireless receiver and a camera.

* * * * *